(12) United States Patent
Wang et al.

(10) Patent No.: US 11,082,975 B2
(45) Date of Patent: Aug. 3, 2021

(54) UPLINK TRANSMIT POWER CONTROL INFORMATION DETERMINATION FOR PERFORMING UPLINK SENDING

(71) Applicant: Huawei Technologies Co., Ltd., Shenzhen (CN)

(72) Inventors: Yafei Wang, Shanghai (CN); Chi Zhang, Shanghai (CN); Zhengwei Gong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/579,529

(22) Filed: Sep. 23, 2019

(65) Prior Publication Data

US 2020/0022142 A1    Jan. 16, 2020

Related U.S. Application Data

(63) Continuation of application No. PCT/CN2018/080343, filed on Mar. 23, 2018.

(30) Foreign Application Priority Data

Mar. 24, 2017   (CN) .......................... 201710184920.7

(51) Int. Cl.
*H04W 28/02*    (2009.01)
*H04W 72/04*    (2009.01)
(Continued)

(52) U.S. Cl.
CPC ...... *H04W 72/0446* (2013.01); *H04B 10/293* (2013.01); *H04L 5/0053* (2013.01);
(Continued)

(58) Field of Classification Search
CPC ................ H04B 10/293; H04B 10/564; H04B 10/07955; H04W 40/08; H04W 40/10;
(Continued)

(56) References Cited

U.S. PATENT DOCUMENTS

| 2001/0046219 A1 | 11/2001 | Kitade et al. |
| 2011/0038295 A1* | 2/2011 | Hu ........................ H04W 52/58 370/311 |

(Continued)

FOREIGN PATENT DOCUMENTS

| CN | 1236235 A | 11/1999 |
| CN | 102042523 A | 5/2011 |

(Continued)

OTHER PUBLICATIONS

English translation of WO 2015139178 A1 (Year: 2021).*
(Continued)

*Primary Examiner* — Salvador E Rivas
(74) *Attorney, Agent, or Firm* — Leydig, Voit & Mayer, Ltd.

(57) ABSTRACT

Embodiments of this application disclose a power control method, and belong to the field of wireless communications technologies. The method includes: receiving, by a terminal device, signaling from a radio access network device; learning, by the terminal device based on the signaling, of a slot of power control information required by the terminal device to perform uplink sending; and obtaining, by the terminal device in the slot of the power control information required for uplink sending, the power control information required for uplink sending, so that the terminal device dynamically obtains uplink power control information of the terminal device without being based on a static uplink-downlink subframe configuration in the prior art.

14 Claims, 7 Drawing Sheets

(51) Int. Cl.
  *H04L 5/00* (2006.01)
  *H04W 52/14* (2009.01)
  *H04W 52/24* (2009.01)
  *H04W 72/08* (2009.01)
  *H04B 10/293* (2013.01)
  *H04W 40/08* (2009.01)

(52) U.S. Cl.
  CPC ....... *H04W 28/0221* (2013.01); *H04W 40/08* (2013.01); *H04W 52/146* (2013.01); *H04W 52/243* (2013.01); *H04W 72/042* (2013.01); *H04W 72/082* (2013.01)

(58) Field of Classification Search
  CPC ................ H04W 52/00; H04W 52/146; H04W 28/0221
  See application file for complete search history.

(56) References Cited

U.S. PATENT DOCUMENTS

| | | | | |
|---|---|---|---|---|
| 2011/0098077 | A1* | 4/2011 | Gholmieh | H04W 52/56 455/522 |
| 2018/0227897 | A1* | 8/2018 | Yeo | H04W 72/0406 |

FOREIGN PATENT DOCUMENTS

| | | | |
|---|---|---|---|
| CN | 102045823 | A | 5/2011 |
| CN | 106304349 | A | 1/2017 |
| EP | 1163736 | B1 | 7/2004 |
| EP | 2941006 | A1 | 11/2015 |
| EP | 2999278 | A1 | 3/2016 |
| EP | 3113551 | A1 | 1/2017 |
| JP | 5115420 | B2 | 1/2013 |
| KR | 20150140207 | A | 12/2015 |
| WO | WO-2015139178 | A1 * | 9/2015 .......... H04W 52/146 |

OTHER PUBLICATIONS

"Initial Views on Frame Structure for NR Access Technology," 3GPP TSG RAN WG1 Meeting #84bis, Busan, Korea R1-163112, pp. 1-7, 3rd Generation Partnership Project—Valbonne, France (Apr. 11-15, 2016).

"3rd Generation Partnership Project; Technical Specification Group Radio Access Network; Evolved Universal Terrestrial Radio Access (E-UTRA); Radio Resource Control (RRC); Protocol Specification (Release 14)," 3GPP TS 36.331, V14.2.0, pp. 1-721, 3rd Generation Partnership Project, Valbonne, France (Mar. 2017).

* cited by examiner

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

UPLINK TRANSMIT POWER CONTROL INFORMATION DETERMINATION FOR PERFORMING UPLINK SENDING

CROSS-REFERENCE TO RELATED APPLICATIONS

This application is a continuation of International Application No. PCT/CN2018/080343, filed on Mar. 23, 2018, which claims priority to Chinese Patent Application No. 201710184920.7, filed on Mar. 24, 2017. The disclosures of the aforementioned applications are hereby incorporated by reference in their entireties.

TECHNICAL FIELD

This application relates to the field of wireless communications technologies, and in particular, to an uplink transmit power control method and a device.

BACKGROUND

With development of wireless communications technologies, various new services emerge one after another, and different services have different resource requirements. This requires that limited resources can be more efficiently used in a future wireless network. To achieve this objective, more attention is paid to a dynamic time division duplex (D-TDD) technology. The dynamic time division duplex means that a network can flexibly adjust an uplink-downlink subframe configuration. This brings the following advantage: the network can dynamically adjust a TDD uplink-downlink subframe configuration based on uplink-downlink resource requirements of different services, to achieve resource usage optimization. The 3rd Generation Partnership Project (3GPP) has preliminarily completed D-TDD standardization work at the stage of release 12. This feature is referred to as enhanced interference management and traffic adaptation (eIMTA) in the standard.

Standard formulation work oriented to 2020 and future next-generation wireless communications technologies (New Radio Access Technology, NR) has been put on the agenda. Various device producers and operators have discussed evolution and standard solutions of D-TDD in NR, and put forward fully dynamic D-TDD (Fully Dynamic TDD).

In fully dynamic D-TDD, none subframe type is predefined, and a flexible subframe part is one of uplink (UL) or downlink (DL) and has become a focus of NR discussions.

A flexible uplink-downlink subframe configuration may be adapted to more mobile interconnection application scenarios. A real-time interaction application scenario such as online game has a very high requirement on an interaction delay, and an interaction delay can be reduced through fast uplink-downlink subframe switching. An application scenario such as video on demand (VOD) has a very high requirement on a downlink data transmission rate and requires a wireless network to configure more downlink subframe resources. An application such as local resource sharing has a high requirement on an uplink data transmission rate and more uplink subframe resources should be allocated. In this way, wireless transmission resource allocation is more flexible and is adapted to diverse mobile application scenarios, and limited transmission resources are used to a maximum extent.

The fully dynamic TDD scenario is based on a "subframe"-level dynamic change. As a result, interference properties in different subframes are different, and a network side cannot semi-statically configure subframe set information. Currently, there is no solution to how to determine an uplink transmit power control parameter when a subframe type is flexible and changeable.

SUMMARY

To satisfy a future mobile communication requirement, improve system performance, and dynamically determine an uplink transmit power control parameter when a system subframe type can flexibly change, this application provides an uplink transmit power control method and an apparatus. The technical solutions are as follows:

According to a first aspect, an embodiment of this application provides an uplink transmit power control method. The method is mainly provided from a perspective of a terminal device. The method includes: receiving, by a terminal device, control signaling sent by a radio access network device; learning, by the terminal device based on the control signaling, of a slot of power control information required by the terminal device to perform uplink sending; and obtaining, by the terminal device in the slot of the power control information required for uplink sending, the power control information required for uplink sending. In this way, the terminal device can dynamically obtain power control information, for example, closed-loop power control parameter indication information, related to uplink power control of the terminal device without being based on a static uplink-downlink subframe configuration. Therefore, the method can satisfy a future mobile communication requirement and improve system performance.

In a possible implementation, the control signaling includes indication information, the indication information includes slot offset information, and the slot offset information is used to indicate an offset between the slot of the power control information required by the terminal device to perform uplink sending and a slot scheduled to the terminal device to send an uplink physical channel. The terminal device can learn, based on the control signaling, for example, based on the slot offset, of the slot of the power control information required by the terminal device to perform uplink sending.

In a possible implementation, the slot scheduled to the terminal device to send the uplink physical channel is one slot; and the terminal device sends the uplink physical channel in the slot by using the power control information.

In a possible implementation, the slot scheduled to the terminal device to send the uplink physical channel is a plurality of consecutive uplink slots, and the terminal device sends the uplink physical channel in each of the plurality of consecutive uplink slots by using the power control information. In this way, in an uplink slot aggregation scenario, the uplink physical channel may be sent in each uplink slot by using the power control information. Therefore, the terminal device can dynamically obtain power control information, for example, closed-loop parameter indication information, related to uplink power control of the terminal device without being based on a static uplink-downlink subframe configuration. Therefore, the method can satisfy a future mobile communication requirement and improve system performance.

In a possible implementation, the determining, by the terminal device in each of the plurality of consecutive uplink slots by using the power control information, transmit power used to send the uplink physical channel includes: when a calculation mode of a power control parameter is an accumulation mode, transmit power of another slot after the first slot in the plurality of consecutive uplink slots is the same as that of the first slot; when a calculation mode of a power control parameter is an absolute value mode, a serial number of the first slot in the plurality of consecutive uplink slots is i and corresponds to a slot offset k, and a serial number of a subsequent slot is i+n and sequentially corresponds to a slot offset k+n, learning, based on the serial number of the slot and the corresponding slot offset by subtracting (k+n) from (i+n), of the slot of the power control information required by the terminal device to perform uplink sending, where i, k, and n are all natural numbers; or using the plurality of consecutive uplink slots as a slot group, where a serial number of the slot group is the same as that of the first slot in the plurality of consecutive uplink slots, and learning, based on the serial number of the slot group and the slot offset information, of the slot of the power control information required by the terminal device to perform uplink sending. From a perspective of an effect, in an uplink multislot aggregation scenario, in a feasible manner, for a plurality of uplink slots, a power control mechanism that is the same as or similar to that of the first slot in the plurality of slots is used, to simplify control signaling design and improve system performance.

In a possible implementation, the control signaling is layer 1 or layer 2 signaling, the indication information is uplink scheduling information, the uplink scheduling information may be an uplink grant, the uplink scheduling information includes the slot offset information, and the uplink physical channel is a physical uplink shared channel. The control signaling may alternatively be higher layer control signaling. The layer 1 or layer 2 control signaling described herein may be similar to physical layer signaling in a communication standard, and the higher layer control signaling described herein may be radio resource control signaling (RRC) signaling or broadcast signaling in a communication standard.

In a possible implementation, the slot offset information may further include a plurality of slot offsets, and all of the plurality of slot offsets indicate offsets between a plurality of slots of a plurality of pieces of power control information required by the terminal device to perform uplink sending and the slot scheduled to the terminal device to send the uplink physical channel. The terminal device can learn, based on the plurality of slot offsets, of the plurality of slots that separately correspond to the plurality of slot offsets and that are of the plurality of pieces of power control information required by the terminal device to perform uplink sending. In this way, the terminal device can dynamically obtain power control information, for example, closed-loop parameter indication information, related to uplink power control of the terminal device without being based on a static uplink-downlink subframe configuration. Therefore, the method can satisfy a future mobile communication requirement and improve system performance.

In a possible implementation, the control signaling is layer 1 or layer 2 control signaling, the indication information is downlink scheduling information, the downlink scheduling information includes the plurality of slot offsets, and the uplink physical channel is a physical uplink control channel. The control signaling may alternatively be higher layer control signaling. The layer 1 or layer 2 control signaling described herein may be similar to physical layer signaling in a communication standard, and the higher layer control signaling described herein may be radio resource control (RRC) signaling or broadcast signaling in a communication standard.

According to a second aspect, an embodiment of this application provides an uplink transmit power control method. The method is mainly provided from a perspective of a radio access network device. The method according to the second aspect and various possible implementations thereof include: technical solutions performed by the radio access network device in the first aspect and various feasible implementations thereof.

According to a third aspect, an embodiment of this application provides an uplink transmit power control method. The method is mainly provided from a perspective of a terminal device. The method includes: receiving, by a terminal device, control signaling from a radio access network device, where the control signaling includes a plurality of pieces of indication information, and each piece of indication information includes power control information required by one terminal device to send an uplink physical channel; and obtaining, by the terminal device from the plurality of pieces of indication information, corresponding power control information required by the terminal device to send an uplink physical channel. In this way, the terminal device can dynamically obtain power control information, for example, closed-loop parameter indication information, related to uplink power control of the terminal device without being based on a static uplink-downlink subframe configuration. Therefore, the method can satisfy a future mobile communication requirement and improve system performance.

In a possible implementation, a slot of the control signaling is the last slot that includes the control signaling and that is detected by the terminal device before the terminal device sends the uplink physical channel.

In a possible implementation, the terminal device belongs to a terminal device group, and each of the plurality of pieces of indication information corresponds to a plurality of terminal devices in the terminal device group.

In a possible implementation, the control signaling is layer 1 or layer 2 signaling. The obtaining, by the terminal device from the plurality of pieces of indication information, corresponding power control information required by the terminal device to send an uplink physical channel includes: The layer 1 or layer 2 signaling carries power control information used for the terminal device group, and the layer 1 or layer 2 signaling is scrambled by using a radio network identifier, for example, by using a radio network temporary identifier (RNTI) used for the terminal device group. The terminal device detects the layer 1 or layer 2 signaling by using the radio network temporary identifier, to obtain the power control information used for the terminal device group. The terminal device obtains, based on a correspondence between content of the obtained power control information used for the terminal device group and the terminal device and from the power control information used for the terminal device group, the power control information required by the terminal device to send the uplink physical channel, where the uplink physical channel is a physical uplink shared channel or a physical uplink control channel. The layer 1 or layer 2 control signaling described herein may be similar to physical layer signaling in a communication standard, and higher layer control signaling described herein may be radio resource control (RRC) signaling or broadcast signaling in a communication standard.

According to a fourth aspect, an embodiment of this application provides an uplink transmit power control method. The method is mainly provided from a perspective of a radio access network device. The method according to the fourth aspect and various possible implementations thereof include: technical solutions performed by the radio access network device in the third aspect and various feasible implementations thereof.

According to a fifth aspect, an embodiment of this application further provides an uplink power control method. The method is mainly provided from a perspective of a terminal device. The method includes: receiving, by a terminal device, control signaling from a radio access network device, where the control signaling includes a plurality of pieces of indication information, and at least two of the plurality of pieces of indication information include power control information required by the terminal device to send an uplink physical channel; and sending, by the terminal device, the uplink physical channel by using the power control information that is included in the at least two pieces of indication information and that is required by the terminal device to send the uplink physical channel. In this solution, the terminal device can dynamically obtain power control information, for example, closed-loop parameter indication information, related to uplink power control of the terminal device without being based on a static uplink-downlink subframe configuration. Therefore, the method can satisfy a future mobile communication requirement and improve system performance.

In a possible implementation, a slot of the control signaling is the last slot that includes the control signaling and that is detected by the terminal device before the terminal device sends the uplink physical channel.

In a possible implementation, the control signaling is layer 1 or layer 2 signaling, and the layer 1 or layer 2 signaling is scrambled by using a radio network temporary identifier. A process of obtaining, by the terminal device, the power control information required by the terminal device to send the uplink physical channel includes: detecting, by the terminal device, the layer 1 or layer 2 signaling based on the radio network temporary identifier, to obtain the power control information required by the terminal device to send the uplink physical channel; and obtaining, by the terminal device based on a correspondence between the plurality of pieces of indication information in the layer 1 or layer 2 signaling and the terminal device and from the plurality of pieces of indication information, power control information corresponding to uplink control information sent by the terminal device. The layer 1 or layer 2 control signaling described herein may be similar to physical layer signaling in a communication standard, and higher layer control signaling described herein may be radio resource control (RRC) signaling or broadcast signaling in a communication standard.

According to a sixth aspect, an embodiment of this application provides an uplink transmit power control method. The method is mainly provided from a perspective of a radio access network device. The method according to the sixth aspect and various possible implementations thereof include: technical solutions performed by the radio access network device in the fifth aspect and various feasible implementations thereof.

According to a seventh aspect, an embodiment of this application further provides a communications device. The communications device has the functions of the terminal device in the uplink transmit power control method in the first aspect, the third aspect, and the fifth aspect. The functions may be implemented by hardware or by hardware executing corresponding software. The hardware or the software includes one or more modules corresponding to the functions or the method steps. For example, the communications device may include a receiver and a processor, and may further include a transceiver.

According to an eighth aspect, an embodiment of this application further provides a communications device. The communications device has the functions of the radio access network device in the uplink transmit power control method in the second aspect, the fourth aspect, and the sixth aspect. The functions may be implemented by hardware or by hardware executing corresponding software. The hardware or the software includes one or more modules corresponding to the functions or the method steps. For example, the communications device may include a receiver and a processor, and may further include a transceiver.

According to a ninth aspect, an embodiment of the present invention provides a terminal device, including: a processor, a memory, a transceiver, and a bus. The processor, the memory, and the transceiver are coupled by using the bus. The memory is configured to store an instruction, the transceiver is configured to communicate with a radio access network device, and the processor is configured to execute the instruction stored in the memory, to enable the terminal device to perform the uplink transmit power control method performed on the terminal device side in the first aspect, the third aspect, and the fifth aspect.

According to a tenth aspect, an embodiment of the present invention provides a radio access network device, including: a processor, a memory, a transceiver, and a bus. The processor, the memory, and the transceiver are coupled by using the bus. The memory is configured to store an instruction, the transceiver is configured to communicate with a terminal device, and the processor is configured to execute the instruction stored in the memory, to enable the radio access network device to perform the uplink transmit power control method performed on the radio access network device side in the second aspect, the fourth aspect, and the sixth aspect.

According to an eleventh aspect, an embodiment of the present invention provides a computer-readable medium. The computer-readable medium includes a computer-executable instruction, and the computer-executable instruction is used to enable a terminal device to perform the uplink transmit power control method performed on the terminal device side in the first aspect, the third aspect, and the fifth aspect of the present invention.

According to a twelfth aspect, an embodiment of the present invention provides a computer-readable medium. The computer-readable medium includes a computer-executable instruction, and the computer-executable instruction is used to enable a terminal device to perform the uplink transmit power control method performed on the radio access network device side in the second aspect, the fourth aspect, and the sixth aspect of the present invention.

According to a thirteenth aspect, an embodiment of the present invention provides a system chip. The system chip may be applied to a terminal device, and the system chip includes: at least one communications interface, at least one processor, and at least one memory. The communications interface, the memory, and the processor are connected by using a bus. The processor executes an instruction stored in the memory, to enable the terminal device to perform the method performed on the terminal device side in the first aspect, the third aspect, and the fifth aspect of the present invention.

According to a fourteenth aspect, an embodiment of the present invention provides a system chip. The system chip may be applied to a radio access network device, and the system chip includes: at least one communications interface, at least one processor, and at least one memory. The communications interface, the memory, and the processor are connected by using a bus. The processor executes an instruction stored in the memory, to enable the radio access network device to perform the method performed on the radio access network device side in the second aspect, the fourth aspect, and the sixth aspect of the present invention.

According to a fifteenth aspect, the present invention provides a communications system. The communications system includes a terminal device and a radio access network device. The terminal device is configured to perform the method in the first aspect, the third aspect, and the fifth aspect of the present invention, and the access network device is configured to perform the method in the second aspect, the fourth aspect, and the sixth aspect of the present invention.

According to the uplink transmit power control method and the device provided in the embodiments, the terminal device receives the control signaling from the radio access network device, and the terminal device learns, based on the control signaling, of the slot of the power control information required by the terminal device to perform uplink sending, so that the terminal device can obtain, in the slot of the power control information required for uplink sending, the power control information required for uplink sending. In the possible implementations of the various aspects provided in the embodiments of the present invention, the terminal device can dynamically obtain power control information, for example, closed-loop power control parameter indication information, related to uplink transmit power control of the terminal device without being based on a static uplink-downlink subframe configuration. Therefore, the method can satisfy a future mobile communication requirement and improve system performance.

DESCRIPTION OF EMBODIMENTS

To make the objectives, technical solutions, and advantages of this application clearer, the following further describes the implementations of this application in detail with reference to the accompanying drawings.

A radio access network device mentioned in the embodiments of this application is an apparatus that is deployed in a radio access network and that is used to provide a wireless communication function for a terminal device. The radio access network device may include a macro base station, a micro base station (also referred to as a small cell), a relay station, or a transmission reception point (TRP) in various forms or the like. In systems using different radio access technologies, a device having a function of a network device may be named differently. For ease of description, in all the embodiments of this application, all the foregoing apparatuses that provide a wireless communication function for the terminal device are collectively referred to as a network device.

The terminal device in the embodiments of this application may include various handheld devices, in-vehicle devices, wearable devices, or computing devices that have a wireless communication function, or other processing devices connected to a wireless modem. The terminal device may be referred to as a mobile station (MS), user equipment, or terminal equipment, and may include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal device, or the like. The terminal device may alternatively be a device that is in a fixed location and that has a wireless communication function similar to that of the foregoing terminal device. For ease of description, the devices mentioned above are collectively referred to as a terminal device in all the embodiments of this application.

When NR supports flexible uplink-downlink resource allocation at a per-slot level, it indicates that NR supports a dynamic TDD operation having no configuration. The embodiments of the present invention resolve the following problem: when there is no uplink-downlink (DL/UL) subframe configuration and consequently an original closed-loop power control parameter indication mechanism cannot be applied to NR, how to define a closed-loop power control parameter indication mechanism to adapt to a dynamic TDD operation when there is no DL/UL configuration.

In this application, letters such as i, j, k, and m of slot numbers usually may be used to indicate natural numbers, and are not described again one by one in detail subsequently.

Figures 1, 2:
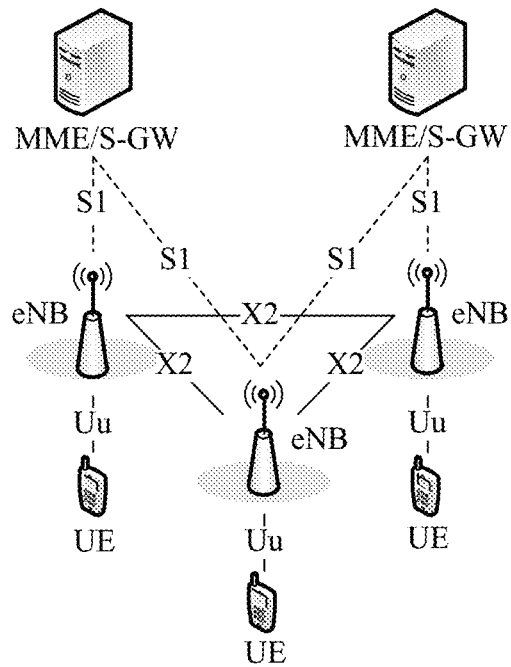
FIG. 1 is a schematic diagram of a system uplink-downlink subframe configuration in the prior art.
FIG. 2 is a schematic diagram of an applicable system architecture according to an embodiment of the present invention.

In an eIMTA feature in a long term evolution (LTE) system, a double-loop uplink power control enhancement solution based on a subframe set is used, and includes open-loop power control enhancement and closed-loop power control enhancement. FIG. 1 is a schematic diagram of an uplink-downlink subframe configuration in the prior art. D indicates a downlink subframe, U indicates an uplink subframe, and S indicates a special subframe. The special subframe is used to switch between downlink and uplink, and has a same length as another subframe. Generally, a period in which the special subframe appears may be specified as 5 milliseconds or 10 milliseconds. In FIG. 1, a set including subframes whose subframe numbers are 3, 4, 6, 7, 8, and 9 in line blocks include changeable subframes, and subframes of other numbers form a fixed subframe set. Different subframe sets are semistatically configured on a network side. For a changeable subframe set, there is interference between user equipments (UE-UE). For a fixed subframe set, there is no UE-UE interference. Therefore, different power control parameter sets are used for the two different subframe sets.

In the open-loop power control enhancement solution, different open-loop power control parameters are set for the two types of subframe sets (the changeable subframe set and the fixed subframe set). In the closed-loop power control enhancement solution, different closed-loop power control instructions (Transmitter Power Control, TPC) are accumulated for the two types of subframe sets (the changeable subframe set and the fixed subframe set).

Currently, a power control solution of a physical uplink shared channel (PUSCH) is as follows: if UE sends only a PUSCH and sends no physical uplink control channel (PUCCH) in a serving cell indicated by c, uplink transmit power of the UE may be determined as:

$$P_{PUSCH,c}(i) = \min\left\{\begin{array}{l}P_{CMAX,c}(i),\\ 10\log_{10}(M_{PUSCH,c}(i)) + P_{O\_PUSCH,c}(j) + \alpha_c(j) \cdot PL_c + \Delta_{TF,c}(i) + f_c(i)\end{array}\right\}; \quad (1)$$

or if UE sends both a PUSCH and a PUCCH in a serving cell c, transmit power of the PUSCH may be determined as:

$$P_{PUSCH,c}(i) = \min\left\{\begin{array}{l}10\log_{10}(\hat{P}_{CMAX,c}(i) - \hat{P}_{PUCCH}(i)),\\ 10\log_{10}(M_{PUSCH,c}(i)) + P_{O\_PUSCH,c}(j) + \alpha_c(j) \cdot PL_c + \Delta_{TF,c}(i) + f_c(i)\end{array}\right\}, \quad (2)$$

where $\hat{P}_{CMAX,c}(i)$ indicates maximum transmit power of the UE, $\hat{P}_{CMAX,c}(i)$ is a linear value of the maximum transmit power $M_{PUSCH,c}(i)$ indicates, i a quantity of resource blocks (RB) allocated to the UE for PUSCH transmission, $PL_C$ is an estimated downlink path loss value, $\alpha_c(j)$ is a path loss compensation factor, $P_{O\_PUSCH,c}(j)$ indicates power that a base station expects to receive and includes two parts: $P_{O\_PUSCH,c}(j)=P_{O\_UE\_PUSCH,c}(j)+P_{O\_NOMINAL\_PUSCH,c}(j)$, $P_{O\_NOMINAL\_PUSCH,c}(j)$ is a cell-specific parameter configured by using higher layer signaling, and $P_{O\_UE\_PUSCH,c}(j)$ is a UE parameter configured by using system higher layer signaling, for example, an uplink power control information element specified in 3GPP TS 36.331 is defined as follows:

```
UplinkPowerControlCommon ::=    SEQUENCE {
    p0-NominalPUSCH                 INTEGER (-126..24),
    alpha                           Alpha-r12,
    p0-NominalPUCCH                 INTEGER (-127..-96),
    deltaFList-PUCCH                DeltaFList-PUCCH,
    deltaPreambleMsg3               INTEGER (-1..6)
}.
```

In addition, in the formula (1) and/or the formula (2), $\Delta_{TF,c}(i)=10\log_{10}((2^{BPRE \cdot K_s}-1) \cdot \beta_{offset}^{PUSCH})$, and is an offset related to a modulation and coding scheme (MCS). There are only two cases: $K_S=0$ and $K_S=1.25$. A specific value of $K_S$ is configured by using a higher layer parameter delta-MCS-Enabled, for example, is configured by using a definition of an uplink power control information element specified in 3GPP TS 36.331:

```
UplinkPowerControlDedicated ::=  SEQUENCE {
    p0-UE-PUSCH                      INTEGER (-8..7),
    deltaMCS-Enabled                 ENUMERATED {en0, en1},
    accumulationEnabled              BOOLEAN,
    p0-UE-PUCCH                      INTEGER (-8..7),
    pSRS-Offset                      INTEGER (0..15),
    filterCoefficient                FilterCoefficient DEFAULT fc4
}.
```

For control information transmitted on a PUSCH having no uplink shared channel (UL-SCH) data, $BPRE=O_{CQI}/N_{RE}$, and $$BPRE = \sum_{r=0}^{C-1} K_r / N_{RE},$$

where C is a quantity of code blocks, $K_r$ is a size of a code block r, and $O_{CQI}$ is a quantity of CQI/PMI bits including a CRC check bit. $N_{RE}$ is a quantity of REs (Resource elements), and a value of $N_{RE}$ is $N_{RE}=M_{sc}^{PUSCH-initial} \cdot N_{symb}^{PUSCH-initial}$, where $N_{symb}^{PUSCH-initial}$ is a quantity of single carrier frequency division multiple access (SC-FDMA) symbols carrying PUSCH data in an initial PUSCH transmission subframe, and $M_{sc}^{PUSCH-initial}$ is a quantity of subcarriers scheduled for allocation in the initial PUSCH transmission subframe. For control data transmitted on a PUSCH on which no UL-SCH data is transmitted, $\beta_{offset}^{PUSCH}=\beta_{offset}^{CQI}$, and is 1 in other cases. $f_c(i)$ indicates a power adjustment related to a TPC command.

If a higher layer signaling parameter Accumulation-enabled indicates that an accumulation mode is used, $f_c(i)=f_c(i-1)+\delta_{PUSCH,c}(i-K_{PUSCH})$ and $f_{c,2}(i)=f_{c,2}(i-1)+\delta_{PUSCH,c}(i-K_{PUSCH})$.

If an absolute value mode is used, $f_c(i)=\delta_{PUSCH,c}(i-K_{PUSCH})$ and $f_{c,2}(i)=\delta_{PUSCH,c}(i-K_{PUSCH})$. $\delta_{PUSCH,c}(i-K_{PUSCH})$ is indicated by a TPC parameter in downlink control information (DCI) in a subframe $i-K_{PUSCH}$. A value of $K_{PUSCH}$ is provided in the following table in TDD UL/DL configurations 1 to 6:

| TDD UL/DL Config-uration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

In a configuration 0, if a PUSCH is transmitted in a subframe 2 or 7, a least significant bit of an UL index of the PUSCH is 1, and $K_{PUSCH}=7$. In other cases, $K_{PUSCH}$ is determined based on the foregoing table.

Currently, in a PUCCH power control solution, if a serving cell c is a primary cell, in a PUCCH format 1/1a/1b/2/2a/2b/3, power of a PUCCH may be determined as:

$$P_{PUCCH}(i) = \min\begin{cases} P_{CMAX,c}(i), \\ P_{0\_PUCCH} + PL_c + h(n_{CQI},n_{HARQ},n_{SR}) + \Delta_{F\_PUCCH}(F) + \Delta_{TxD}(F') + g(i) \end{cases}, \quad (3)$$

where $\Delta_{F\_PUCCH}(F)$ is a parameter configured by using higher layer signaling. When UE is configured to transmit a PUCCH on two antenna ports, a value of $\Delta_{TxD}(F')$ is configured by using a higher layer parameter. In other cases, $\Delta_{TxD}(F')=0$. $h(n_{CQI},n_{HARQ},n_{SR})$ is a parameter value related to a PUCCH format, and $n_{CQI}$ is equivalent to an information bit indicating channel quality information (CQI). For UE that transmits no UL-SCH transport block, if a subframe i is configured to transmit an SR (scheduling request), $n_{SR}=1$. Otherwise, $n_{SR}=0$. $n_{HARQ}$ is a parameter related to HARQ-ACK bits. g(i) indicates a power adjustment related to a TPC command.

$$g(i) = g(i-1) + \sum_{m=0}^{M-1} \delta_{PUCCH}(i-k_m).$$

In TDD, M and $k_m$ are determined based on the following table:

| UL/DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |

-continued

| UL/DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

If the serving cell c is a primary cell, in a PUCCH format 4/5, power of a PUCCH may be:

$$P_{PUCCH}(i) = \min\left\{ \begin{array}{l} P_{CMAX,c}(i), \\ P_{0\_PUCCH} + PL_c + 10\log_{10}(M_{PUCCH,c}(i)) + \Delta_{TF,c}(i) + \Delta_{F\_PUCCH}(F) + g(i) \end{array} \right\}$$

In addition, a power control solution of a sounding reference signal sounding reference symbol (SRS) of a channel is currently:

$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\}$, where $P_{SRS\_OFFSET,c}(m)$ is a parameter semistatically configured by a higher layer, and is related to a trigger mode of SRS transmission.

As can be learned from the current power control solution, a slot of TPC parameter indication information is determined based on a DL/UL configuration, and is provided in value tables in different configurations. Apparently, the parameter determining manner cannot satisfy a parameter indication requirement of NR fully dynamic TDD, that is, a per-slot-based DL/UL switching scenario.

In view of this, in the embodiments of the present invention, fully dynamic TDD in NR discussions is used as a scenario to design an uplink power control solution, to resolve a problem of how to indicate a TPC parameter in a scenario in which an uplink-downlink subframe configuration is not predefined.

The embodiments of the present invention may be applied to an LTE or 5G NR system, and a specific applicable system is not limited in the present invention.

FIG. 2 is a schematic architectural diagram of an applicable system according to an embodiment of the present invention. Descriptions of network elements and interfaces are as follows:

A mobility management entity (MME) is a key control node in an LTE system defined in 3GPP, is a core network element, and is mainly responsible for signaling processing, that is, a control plane function, including functions such as access control, mobility management, attaching and detaching, session management, and gateway selection. A serving gateway (S-GW) is an important network element in a core network in a 3GPP LTE system, and is mainly responsible for a user plane function of user data forwarding, that is, routing and forwarding a data packet under control by an MME.

An evolved NodeB (eNodeB) is a base station in an LTE system, and is mainly responsible for functions such as radio resource management, QoS management, and data compression and encryption on an air interface side. On a core network side, the eNB is mainly responsible for forwarding control plane signaling to an MME and forwarding user plane service data to an S-GW. It should be noted that in NR, an entity concept corresponding to the eNB is a transmission reception point (TRP).

User equipment (UE) is a device that accesses a network side by using an eNB in an LTE system, for example, may be a handheld terminal, a notebook computer, or another device that may access a network.

S1 interface: The S1 interface is a standard interface between an eNB and a core network. The eNB is connected to an MME through an S1-MME interface to transmit control signaling. The eNB is connected to an S-GW through an S1-U interface to transmit user data. The S1-MME interface and the S1-U interface are collectively referred to as the S1 interface.

X2 interface: The X2 interface is a standard interface between eNBs and is used for interworking between base stations.

Uu interface: The Uu interface is a radio interface between UE and a base station. The UE accesses an LTE network through the Uu interface.

Related network elements in the embodiments of the present invention include: a radio access network device and a terminal device. For example, the radio access network device may be an eNodeB, a TRP, or the like, and the terminal device may be UE or the like. This not limited herein.

Figure 3:
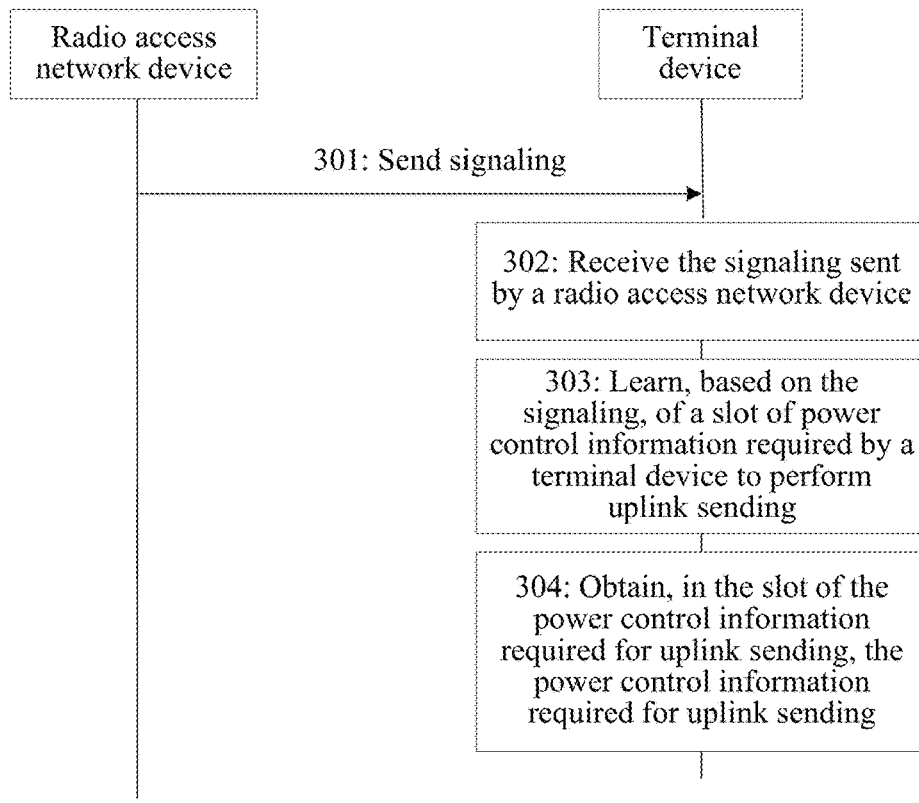
FIG. 3 is a flowchart of an uplink transmit power control method according to an embodiment of this application.

Generally, based on a possible system application scenario such as LTE or 5G NR, an embodiment of this application provides an uplink transmit power control method. As shown in FIG. 3, the method includes the following steps.

Step 301: A radio access network device sends signaling to a terminal device.

Step 302: The terminal device receives the signaling from the radio access network device.

Step 303: The terminal device learns, based on the signaling, of a slot of power control information required by the terminal device to perform uplink sending.

Step 304: The terminal device obtains, in the slot of the power control information required for uplink sending, the power control information required for uplink sending.

In this way, the terminal device can dynamically obtain power control information, for example, closed-loop power control parameter indication information, related to uplink power control of the terminal device without being based on a static uplink-downlink subframe configuration. Therefore, the method can satisfy a future mobile communication requirement and improve system performance.

Optionally, in a possible implementation, the signaling includes indication information, the indication information includes slot offset information, and the slot offset information is used to indicate an offset between the slot of the power control information required by the terminal device to perform uplink sending and a slot scheduled to the terminal device to send an uplink physical channel. The terminal device can learn, based on the signaling, for example, based on the slot offset, of the slot of the power control information required by the terminal device to perform uplink sending.

In a possible implementation, the slot scheduled to the terminal device to send the uplink physical channel is one slot; and the terminal device sends the uplink physical channel in the slot by using the power control information.

In a possible implementation, the slot scheduled to the terminal device at a time to send the uplink physical channel is an aggregated slot including a plurality of consecutive uplink slots, and the terminal device sends the uplink physical channel in each uplink slot in the aggregated slot by using the power control information. In this way, in an uplink slot aggregation scenario, the uplink physical channel may be sent in each uplink slot by using the power control information. Therefore, the terminal device can dynamically obtain power control parameter information, for example, closed-loop parameter indication information, related to uplink power control of the terminal device without being based on a static uplink-downlink subframe configuration. Therefore, the method can satisfy a future mobile communication requirement and improve system performance.

In a possible implementation, the sending, by the terminal device in each of the plurality of consecutive uplink slots by using the power control information, the uplink physical channel includes: when a calculation mode of power control information is an accumulation mode, transmit power of another slot after the first slot in the plurality of consecutive uplink slots is the same as that of the first slot; when a calculation mode of power control information is an absolute value mode, a serial number of the first slot in the plurality of consecutive uplink slots is i and corresponds to a slot offset k, and a serial number of a subsequent slot is i+n and sequentially corresponds to a slot offset k+n, learning, based on the serial number of the slot and the corresponding slot offset by subtracting (k+n) from (i+n), of the slot of the power control information required by the terminal device to perform uplink sending, where i, k, and n are all natural numbers; or using the plurality of consecutive uplink slots as a slot group, where a serial number of the slot group is the same as that of the first slot in the plurality of consecutive uplink slots, and learning, based on the serial number of the slot group and the slot offset information, of the slot of the power control information required by the terminal device to perform uplink sending. From a perspective of an effect, in an uplink multislot aggregation scenario, in a feasible manner, for a plurality of uplink slots, a power control mechanism that is the same as or similar to that of the first slot in the plurality of slots is used, to simplify signaling design and improve system performance.

In a possible implementation, the signaling is layer 1 or layer 2 control signaling, the indication information is uplink scheduling information, the uplink scheduling information includes slot offset information, and the uplink physical channel is a physical uplink shared channel. The signaling may alternatively be higher layer signaling. The layer 1 or layer 2 control signaling described herein may be similar to physical layer signaling in a communication standard, and the higher layer control signaling described herein may be radio resource control signaling (RRC) signaling or broadcast signaling in a communication standard.

In a possible implementation, the slot offset information may further include a plurality of slot offsets, and all of the plurality of slot offsets indicate offsets between a plurality of slots of a plurality of pieces of power control information required by the terminal device to perform uplink sending and the slot scheduled to the terminal device to send the uplink physical channel. The terminal device can learn, based on the plurality of slot offsets, of the plurality of slots that separately correspond to the plurality of slot offsets and that are of the plurality of pieces of power control information required by the terminal device to perform uplink sending. In this way, the terminal device can dynamically obtain power control information, for example, closed-loop parameter indication information, related to uplink power control of the terminal device without being based on a static uplink-downlink subframe configuration. Therefore, the method can satisfy a future mobile communication requirement and improve system performance.

In a possible implementation, the signaling is layer 1 or layer 2 control signaling, the indication information is downlink scheduling information, the downlink scheduling information includes the plurality of slot offsets, and the uplink physical channel is a physical uplink control channel. The signaling may alternatively be higher layer signaling. The layer 1 or layer 2 control signaling described herein may be similar to physical layer signaling in a communication standard, and the higher layer control signaling described herein may be radio resource control signaling (RRC) signaling or broadcast signaling in a communication standard.

According to the uplink transmit power control method provided in this embodiment, the terminal device receives the signaling from the radio access network device, and the terminal device may learn, based on the signaling, of the slot of the power control information required by the terminal device to perform uplink sending, so that the terminal device can obtain, in the slot indicated by the signaling, the power control information required for uplink sending. Therefore, the terminal device can dynamically obtain power control information, for example, closed-loop power control parameter indication information, related to uplink transmit power control of the terminal device without being based on a static uplink-downlink subframe configuration. Therefore, the method can satisfy a future mobile communication requirement and improve system performance.

Figure 4:
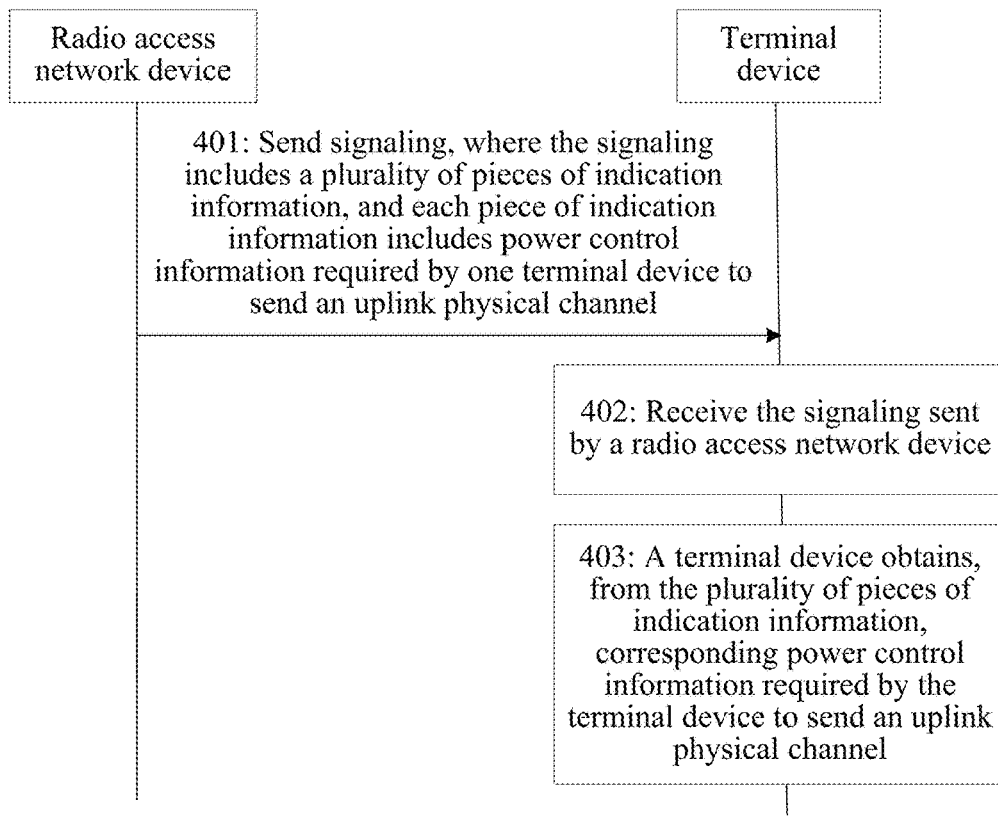
FIG. 4 is a flowchart of an uplink transmit power control method according to an embodiment of this application.

Generally, based on a possible system application scenario such as LTE or 5G NR, an embodiment of this application further provides an uplink transmit power control method. FIG. 4 is a flowchart of an uplink transmit power control method according to an embodiment of this application. The method includes the following steps.

Step 401: A radio access network device sends signaling to a terminal device, where the signaling includes a plurality of pieces of indication information, and each piece of indication information includes power control information required by one terminal device to send an uplink physical channel.

Step 402: The terminal device receives the signaling sent by the radio access network device.

Step 403: The terminal device obtains, from the plurality of pieces of indication information, corresponding power control information required by the terminal device to send an uplink physical channel.

In this way, the terminal device can dynamically obtain power control information, for example, closed-loop parameter indication information, related to uplink power control of the terminal device without being based on a static uplink-downlink subframe configuration. Therefore, the method can satisfy a future mobile communication requirement and improve system performance.

In a possible implementation, a slot of the signaling is the last slot that includes the signaling and that is detected by the terminal device before the terminal device sends the uplink physical channel.

In a possible implementation, the terminal device belongs to a terminal device group, and each of the plurality of pieces of indication information corresponds to at least one terminal device in the terminal device group.

In a possible implementation, the signaling is layer 1 or layer 2 (L1/L2) control signaling, and the L1/L2 signaling indicates power control information of a group of terminals. The L1/L2 signaling used to carry the power control information of the group of terminals is scrambled by using a terminal group-specific RNTI (Radio-Network Temporary Identifier, radio network temporary identifier). The terminal detects the L1/L2 signaling based on the RNTI, to obtain the power control information of the group of terminals. The terminal obtains, based on an index relationship between a power control information field and a terminal in the L1/L2 signaling, a power control information field corresponding to the terminal from the power control information of the group of terminals. The terminal determines specific parameter information of uplink transmit power based on the power control information field.

Figure 5:
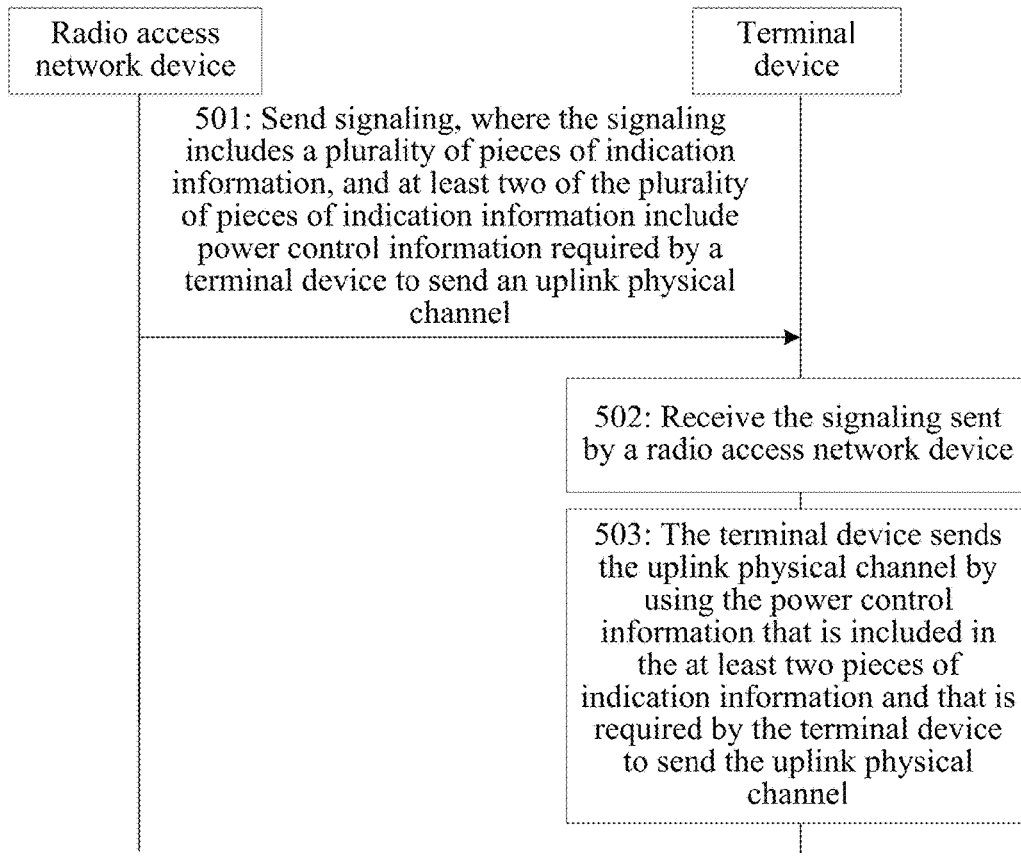
FIG. 5 is a flowchart of an uplink transmit power control method according to an embodiment of this application.

Generally, based on a possible system application scenario such as LTE or 5G NR, an embodiment of this application further provides an uplink transmit power control method. FIG. 5 is a flowchart of an uplink transmit power control method according to an embodiment of this application. The method includes the following steps.

Step 501: A radio access network device sends signaling to a terminal device, where the signaling includes a plurality of pieces of indication information, and at least two of the plurality of pieces of indication information include power control information required by the terminal device to send an uplink physical channel.

Step 502: The terminal device receives the signaling sent by the radio access network device.

Step 503: The terminal device sends the uplink physical channel by using the power control information that is included in the at least two pieces of indication information and that is required by the terminal device to send the uplink physical channel.

In this solution, the terminal device can dynamically obtain power control information, for example, closed-loop parameter indication information, related to uplink power control of the terminal device without being based on a static uplink-downlink subframe configuration. Therefore, the method can satisfy a future mobile communication requirement and improve system performance.

In a possible implementation, a slot of the signaling is the last slot that includes the signaling and that is detected by the terminal device before the terminal device sends the uplink physical channel.

In a possible implementation, the control signaling is layer 1 or layer 2 signaling, and the layer 1 or layer 2 signaling is scrambled by using a radio network temporary identifier. A process of obtaining, by the terminal device, the power control information required by the terminal device to send the uplink physical channel includes: detecting, by the terminal device, the layer 1 or layer 2 signaling based on the radio network temporary identifier, to obtain the power control information required by the terminal device to send the uplink physical channel; and obtaining, by the terminal device based on a correspondence between the plurality of pieces of indication information in the layer 1 or layer 2 signaling and the terminal device and from the plurality of pieces of indication information, power control information corresponding to uplink control information sent by the terminal device, where the indication information may be downlink grant information, and the uplink physical channel is a physical uplink control channel or a physical uplink shared channel. The signaling may alternatively be higher layer signaling. The layer 1 or layer 2 control signaling described herein may be similar to physical layer signaling in a communication standard, and the higher layer control signaling described herein may be radio resource control (RRC) signaling or broadcast signaling in a communication standard.

In transmit power control of a PUSCH, optionally, based on the system shown in FIG. 2, if the radio access network device indicates, by using a parameter in higher layer signaling, that an accumulation mode is used for power control, $f_c(i)=f_c(i-1)+\delta_{PUSCH,c}(i-K_{PUSCH})$ and $f_{c,2}(i)=f_{c,2}(i-1)+\delta_{PUSCH,c}(i-K_{PUSCH})$. If an absolute value mode is used for power control, $f_c(i)=\delta_{PUSCH,c}(i-K_{PUSCH})$ and $f_{c,2}(i)=\delta_{PUSCH,c}(i-K_{PUSCH})$. $\delta_{PUSCH,c}(i-K_{PUSCH})$ may be indicated by a TPC parameter in DCI in a subframe $i-K_{PUSCH}$. An indication manner of $K_{PUSCH}$ may include: sending, by the radio access network device, signaling to the terminal device. The signaling includes indication information, and the indication information is used to indicate a slot of a TPC parameter required in PUSCH power control of the terminal device. The indication information may be an offset, and the offset indicates information about an offset between the slot of the TPC parameter and a slot scheduled to the terminal device (for example, UE) to send the uplink physical channel.

Optionally, the indication information may be uplink scheduling information, for example, uplink (UL) grant information. In a feasible design, indication information of the offset is added to the UL grant information. The uplink scheduling information may be included in downlink control information to be sent to the terminal. Optionally, the UL grant information is sent to the user equipment by using some transmission formats of DCI. For example, offset indication information is added to a format 0 or a format 4 (a specific used format is not limited in this embodiment) of the DCI as follows: "Slot offset of TPC command indicator—n bit". The offset indication information may be used to indicate that n bits are used to indicate a slot location of TPC command information of scheduled UE, so that after learning of the slot location, the terminal device parses out power control information required by the terminal device to perform PUSCH uplink transmission in the slot.

In an optional specific implementation, a slot j is a slot of the UL grant information delivered by the network side, and the UL grant information is used to indicate that a number of the slot scheduled to the terminal device to perform uplink transmission is i; the UL grant information includes indication information, the indication information is used to indicate an offset between a slot of a TPC parameter required by the scheduled UE and a slot i in which the UE is scheduled to send uplink data. It is assumed that the UL grant TPC slot offset is k.

Figure 6:
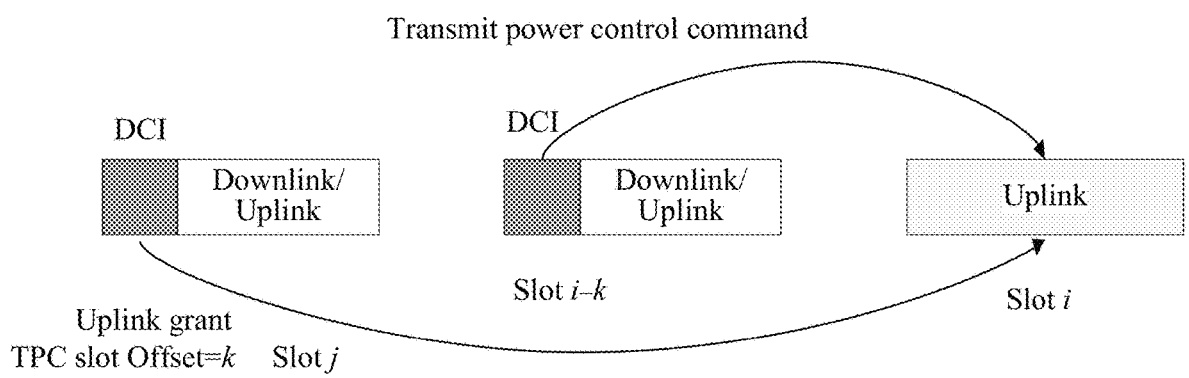
FIG. 6 is a schematic diagram of an uplink transmit power control method according to an embodiment of this application.

When i−k>j, FIG. 6 is a schematic diagram of an uplink transmit power control method according to an embodiment of this application. UL grant information sent in a slot j and TPC parameter indication information related to uplink power control of UE scheduled by the UL grant are in different slots, and the UL grant indicates that a TPC parameter of the slot j is in a slot i−k, where i−k>j.

Figure 7:
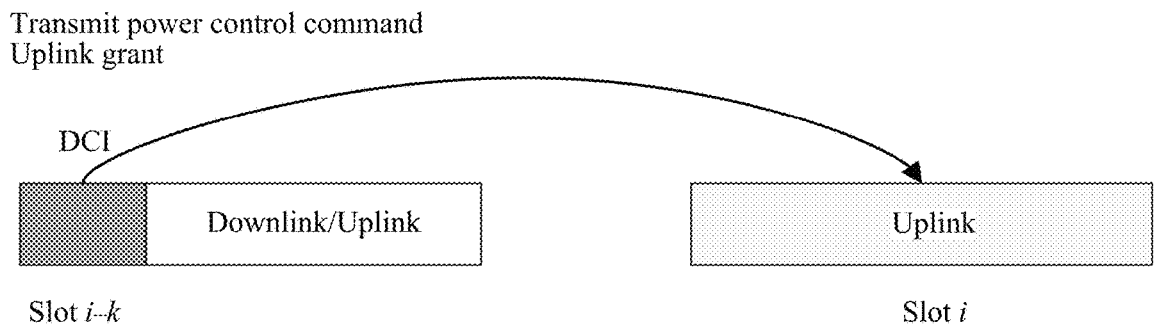
FIG. 7 is a schematic diagram of an uplink transmit power control method according to an embodiment of this application.

When i−k=j, FIG. 7 is a schematic diagram of an uplink transmit power control method according to an embodiment of this application. UL grant information sent in a slot j and TPC parameter indication information related to uplink power control of UE scheduled by the UL grant are in a same slot. The UL grant indicates that a TPC parameter of the slot j is in a slot i−k, where i−k=j.

The technical solutions provided in FIG. 6, FIG. 7, and corresponding descriptions may be applied in a scenario in which an uplink-downlink subframe configuration is not predefined (for example, per-slot-based DL-UL switching), and resolve a problem that a TPC parameter of a PUSCH cannot be indicated in the scenario.

In this embodiment, the radio access network device sends signaling to the terminal device. The signaling includes indication information, the indication information may be used to indicate a slot of a TPC parameter required in PUSCH power control of the terminal device, the indication information may be an offset, and the offset indicates information about an offset between the slot of the TPC parameter and a slot scheduled to the terminal device (for example, the terminal device is UE) to send uplink data. In a design, the indication information may be implemented by using uplink grant information. For example, indication information that is similar to or the same as the offset is added to the UL grant information.

In this way, the solution in this embodiment may be applied to a per-slot-based DL and UL switching scenario. A TPC parameter indication may not be generated based on an existing DL-UL subframe configuration. Coordination between TRPs is used as an example. When a backhaul between TRPs is not ideal and a TRP schedules the slot i in the slot j, neighboring cell scheduling information cannot be obtained, and TPC command information of uplink transmission in the slot i may be delivered to the UE after a base station obtains the neighboring cell scheduling information.

Figure 8:
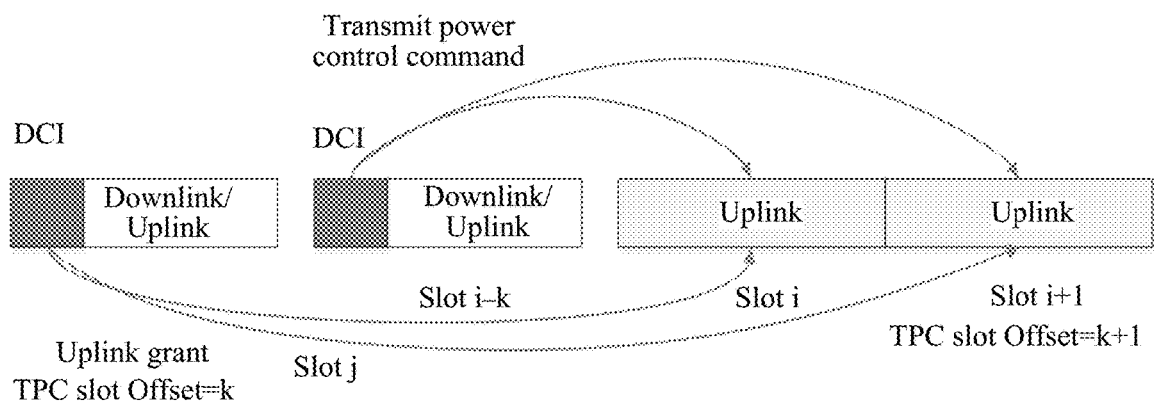
FIG. 8 is a schematic diagram of an uplink transmit power control method according to an embodiment of this application.

In a transmit power control mechanism of a PUSCH, optionally, based on the system shown in FIG. 2, if a higher layer signaling parameter is used to indicate that an accumulation mode is used, $f_c(i)=(i-1)+\delta_{PUSCH,c}(i-K_{PUSCH})$ and $f_{c,2}(i)=f_{c,2}(i-1)+\delta_{PUSCH,c}(i-K_{PUSCH})$. If an absolute value mode is used, $f_c(i)=\delta_{PUSCH,c}(i-K_{PUSCH})$ and $f_{c,2}(i)=\delta_{PUSCH,c}(i-K_{PUSCH})$. $\delta_{PUSCH,c}(i-K_{PUSCH})$ is indicated by a TPC parameter in DCI in a subframe $i-K_{PUSCH}$. When a plurality of consecutive uplink slots are scheduled for same UE at a time, that is, in an uplink slot aggregation scenario, $K_{PUSCH}$ is indicated in the following manner: an offset between a slot of a TPC command related to PUSCH power control and a current slot is indicated by an UL grant. An aggregation level of 2 is used as an example. FIG. 8 is a schematic diagram of an uplink transmit power control method according to an embodiment of this application. In the uplink slot aggregation scenario, the UL grant indicates that a slot of a TPC parameter of an aggregated slot is a slot i−k (including two cases: i−k>j and i−k=j). Specifically, there may be the following three implementations:

(1) If a calculation mode of a TPC parameter is the accumulation mode, a plurality of consecutive uplink slots are aggregated, and transmit power of another uplink slot after the first uplink slot is the same as that of a slot i.

(2) If a calculation mode of a TPC parameter is the absolute value mode, a plurality of consecutive uplink slots are aggregated, a TPC slot offset of another uplink slot after the first uplink slot is added by 1. For example, a number of the first uplink slot is i and a corresponding TPC slot offset number is k. In this case, a number of a subsequent uplink slot is i+1, and a corresponding TPC slot offset number is k+1, and so on.

(3) Regardless of whether a TPC parameter is calculated by using the accumulation mode or the absolute value mode, aggregated uplink slots may be considered as an entire virtual slot, or a plurality of consecutive uplink slots scheduled for same UE at a time are considered as a slot group.

A serial number of the virtual slot or the slot group is the same as a serial number of the first uplink slot of the aggregated slots. The terminal may obtain a closed-loop power control parameter of the terminal based on the number of the virtual slot or the serial number of the slot group and an offset between a slot of a TPC parameter and a slot in which the UE is scheduled to send uplink data.

The technical solution in this embodiment resolves a problem of indicating a TPC parameter of a PUSCH during uplink slot aggregation when an uplink-downlink subframe configuration is not predefined, that is, in a per-slot-based uplink-downlink subframe switching scenario. The technical solution in this embodiment is applicable to a per-slot-based DL/UL switching scenario. TPC parameter indication information during uplink slot aggregation in this scenario does not need to be based on a DL/UL configuration, and a plurality of pieces of TPC command information do not need to be delivered. When a backhaul between TRPs is not ideal and a TRP schedules the slot i in a slot j, neighboring cell scheduling information cannot be obtained, and a TPC command of uplink transmission in the slot i may be delivered to the UE after a base station obtains the neighboring cell scheduling information.

An embodiment of the present invention further provides a PUCCH power control mechanism. Optionally, based on the system shown in FIG. 2, a closed-loop parameter of a PUCCH is determined by using the following formula:

$$g(i) = g(i-1) + \sum_{m=0}^{M-1} \delta_{PUCCH}(i-k_m).$$

$k_m$ is determined in per-slot-based DL/UL switching, that is, not based on a DL/UL configuration. An offset between a slot of a TPC parameter in PUCCH power control and a slot in which UE is scheduled to send uplink control information may be indicated by a DL grant. The DL grant may be sent by using a DCI format 1A/1B/1D/1/2A/2/2B/2C/2D. For example, indication information of the offset is added to the DL grant. Details are shown as follows:

DCI format 1A/1B/1D/1/2A/2/2B/2C/2D; and $k_m$ indicators.

Figure 9:
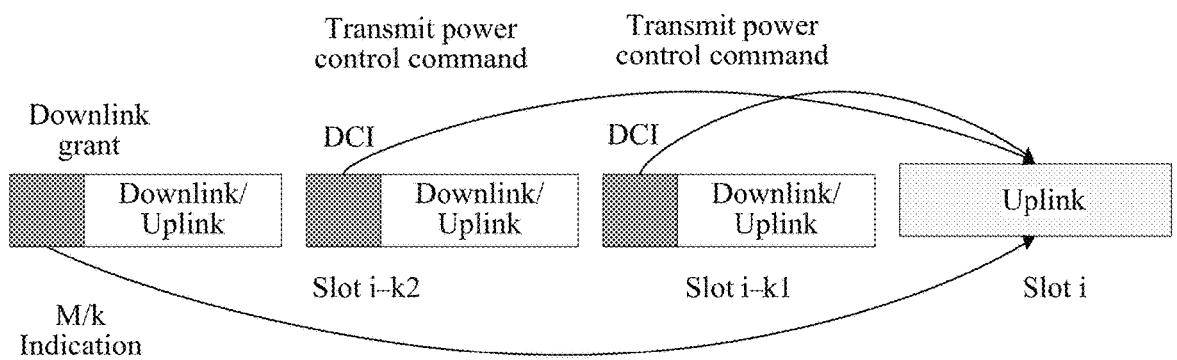
FIG. 9 is a schematic diagram of an uplink transmit power control method according to an embodiment of this application.

In the foregoing technical means, the indication information of the offset between the slot of the TPC command and the slot currently scheduled for uplink sending is added. FIG. 9 is a schematic diagram of an uplink transmit power control method according to an embodiment of this application. For a PUCCH, the DL grant indicates that m TPC parameters of a slot i are in a slot i−k1, a slot i−k2, ..., and a slot i−km.

The technical solution in this embodiment resolves a problem of indicating a TPC parameter of a PUCCH when an uplink-downlink subframe configuration is flexible and is not predefined. When a backhaul between TRPs is not ideal and a TRP schedules the slot i in a slot j, neighboring cell scheduling information cannot be obtained, and a TPC command of uplink transmission in the slot i may be delivered to the UE after a base station obtains the neighboring cell scheduling information. The technical solution of this embodiment is applicable to a per-slot-based DL/UL switching scenario, and TPC parameter indication information of a PUCCH is not based on a DL/UL configuration. Compared with a mode based on a static subframe configuration in the prior art, power control can be performed dynamically and flexibly.

An embodiment of the present invention further provides a transmit power control mechanism of a PUSCH. Optionally, based on the system shown in FIG. 2, for a PUSCH, if a higher layer signaling parameter Accumulation-enabled is used to indicate that an accumulation mode is used, $f_c(i)=f_c(i-1)+\delta_{PUSCH,c}(i-K_{PUSCH})$ and $f_{c,2}(i)=f_{c,2}(i-1)+\delta_{PUSCH,c}(i-K_{PUSCH})$. If an absolute value mode is used, $f_c(i)=\delta_{PUSCH,c}(i-K_{PUSCH})$ and $f_{c,2}(i)=\delta_{PUSCH,c}(i-K_{PUSCH})$. $\delta_{PUSCH,c}(i-K_{PUSCH})$ is indicated by a TPC parameter in DCI in a subframe $i-K_{PUSCH}$. In the technical solution, $K_{PUSCH}$ may not be explicitly indicated and a design is as follows:

For a PUSCH, UE does not need to be notified of an offset between a slot of a TPC command in power control and a slot in which the UE is scheduled to send uplink data, and a value of a closed-loop parameter in uplink transmit power of the UE is determined by using the last power control-specific DCI that is detected by the UE and that is before uplink slot sending.

Figure 10:
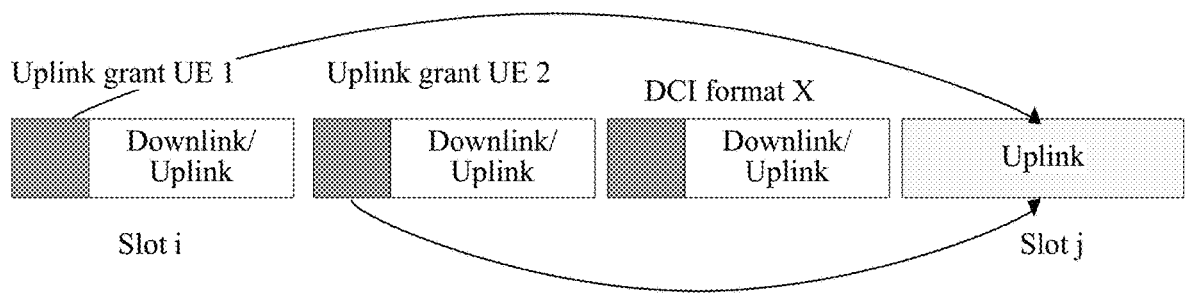
FIG. 10 is a schematic diagram of an uplink transmit power control method according to an embodiment of this application.

FIG. 10 is a schematic diagram of an uplink transmit power control method according to an embodiment of this application. UE-group specific DCI is used to notify TPC parameters of a group of UEs, and the UE does not need to be explicitly notified of a slot of the DCI, and the slot of the DCI is determined by the UE before the UE sends uplink data in a slot j based on detection of the DCI. Before delivering a DCI format X, a base station completes uplink UE scheduling in all slots j. For example, the DCI format X (similar to a DCI format 3/3A) is designed as follows: —TPC command number 1, TPC command number 2, . . . , and TPC command number N. CRC parity bits of the DCI format X may be scrambled by using RNTIs related to TPC parameters of a group of UEs; and an index parameter related to a TPC may be configured for the UE by using higher layer signaling.

The technical solution in this embodiment facilitates coordinated power control between uplink UEs and reduce interference between UEs when there is uplink non-orthogonal access. In the prior art, a plurality of UEs all perform orthogonal access, and may directly determine uplink transmit power based on a TPC-related parameter. In a non-orthogonal case, some frequency domain resources overlap in the slot j, and power adjustment may be performed for uplink sending of specific UE, to reduce interference between UEs. Further, in a DL/UL per-slot-based switching scenario in an NR system, real-time information exchange between TRPs is facilitated, to perform power control of uplink UE.

In the technical solution in this embodiment, the UE does not need to be explicitly notified of an offset between a slot of a TPC parameter in PUSCH power control and a slot in which the UE is scheduled to send uplink data, and the UE determines a value of a closed-loop parameter in uplink transmission of the UE based on detected power control-specific DCI (for example, UE group-specific DCI), to reduce signaling overheads.

Figure 11:
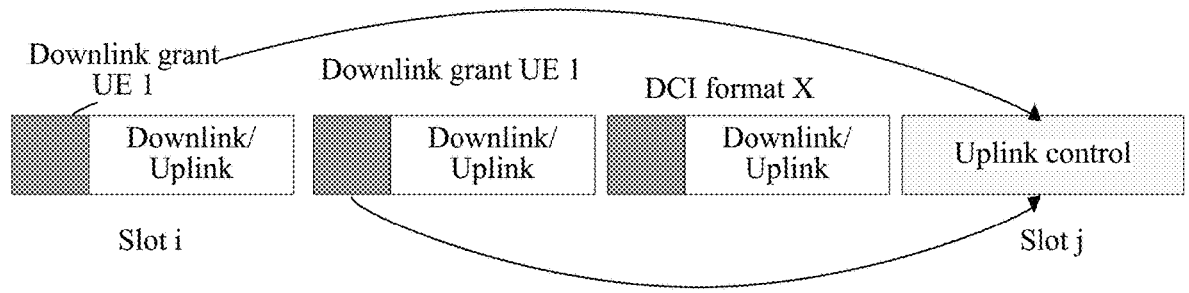
FIG. 11 is a schematic diagram of an uplink transmit power control method according to an embodiment of this application.

An embodiment of the present invention further provides a PUCCH transmit power control mechanism. Optionally, based on the system shown in FIG. 2, the mechanism includes: UE does not need to be explicitly notified of an offset between a slot of a TPC command in PUCCH power control and a slot in which the UE is scheduled to send uplink control information, and a value of a closed-loop parameter in uplink transmit power of the UE is determined by using the last power control-specific DCI (UE-specific DCI indicating only one UE) detected by the UE. FIG. 11 is a schematic diagram of an uplink transmit power control method according to an embodiment of this application. A DCI format X indicates a TPC parameter of UE 1 that corresponds to all downlink slots and that needs to perform HARQ (Hybrid Automatic Repeat Request) feedback in a slot j.

Optionally, downlink transmission is usually related to downlink scheduling allocation on a PDCCH, and a HARQ acknowledgement is transmitted on a PUCCH to respond to downlink transmission. Before delivering the DCI format X, a base station has completed all DL scheduling that is of the UE 1 and that requires HARQ feedback in the slot j. The DCI format X includes a group of TPC commands corresponding to DL slots that require HARQ feedbacks to be completed in the slot j. The technical solution in this embodiment is applicable to a DL/UL per-slot-based switching scenario in NR, and facilitates real-time information exchange between TRPs to perform PUCCH power control.

In the technical solution in this embodiment, a network side may not need to explicitly notify the UE of the offset between the slot of the TPC command in the PUCCH power control of the UE and the slot in which the UE is scheduled to send the uplink control information, and the UE determines a value of a closed-loop parameter in uplink transmission of the UE based on detected power control-specific DCI, to reduce signaling overheads.

Figure 12:
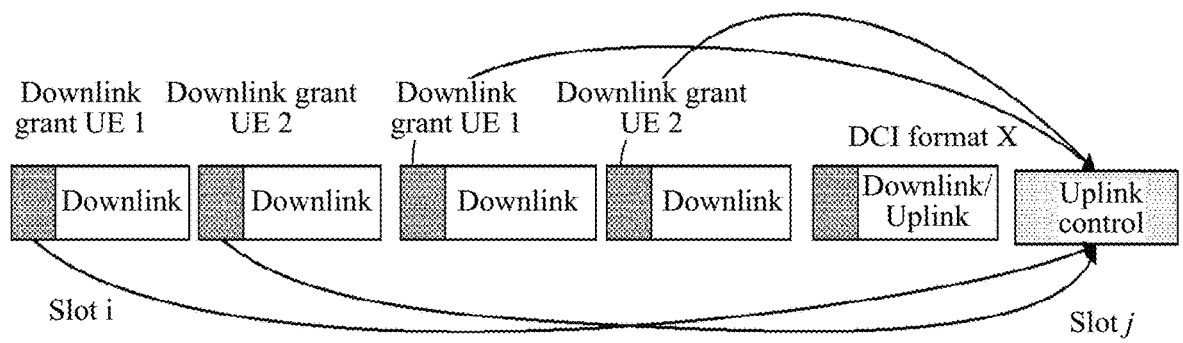
FIG. 12 is a schematic diagram of an uplink transmit power control method according to an embodiment of this application.

An embodiment of the present invention further provides a PUCCH transmit power control mechanism. Optionally, based on the system shown in FIG. 2, the solution includes: UE does not need to be notified of an offset between a slot of TPC parameter indication information in PUCCH power control and a slot in which the UE is scheduled to send uplink control information, and a value of a closed-loop parameter in uplink transmit power of the UE is determined by using the last power control-specific DCI (UE-group specific DCI) detected by the UE. FIG. 12 is a schematic diagram of an uplink transmit power control method according to an embodiment of this application. A DCI format X indicates a group of TPC parameters of UE that needs to complete uplink HARQ feedback in a slot j. Optionally, DL transmission is usually related to downlink scheduling allocation on a PDCCH, and a HARQ acknowledgement is transmitted on a PUCCH to respond to downlink transmission. Before delivering the DCI format X, a base station has completed all DL scheduling that is of a plurality of UEs and that requires HARQ feedbacks in the slot j. The DCI format X includes a group of UE TPC parameter indication information corresponding to UEs that require HARQ feedbacks to be completed in the slot j. This is applicable to a DL/UL per-slot-based switching scenario in NR, and facilitates real-time information exchange between TRPs to perform PUCCH power control.

The technical solution in this embodiment is applicable to a DL/UL per-slot-based switching scenario in an NR system, and facilitates real-time information exchange between TRPs to perform PUCCH power control. In the solution, a network side does not need to explicitly notify the UE of an offset between a slot of a TPC command in PUCCH power control of the UE and a current slot, and the UE determines a value of a closed-loop parameter in uplink transmission of the UE based on detected power control-specific DCI (UE-group specific), to further reduce system signaling overheads.

In the embodiments of the present invention, the radio access network device and the terminal device may be divided into functional units based on the method example, for example, may be divided into functional units corresponding to the functions or method steps, or two or more functions may be integrated in one processing unit. The integrated unit may be implemented in a form of hardware, or may be implemented in a form of a software functional unit. It should be noted that, in the embodiments of the present invention, unit division is an example, and is merely a logical function division. In actual implementation, another division manner may be used.

Figure 13:
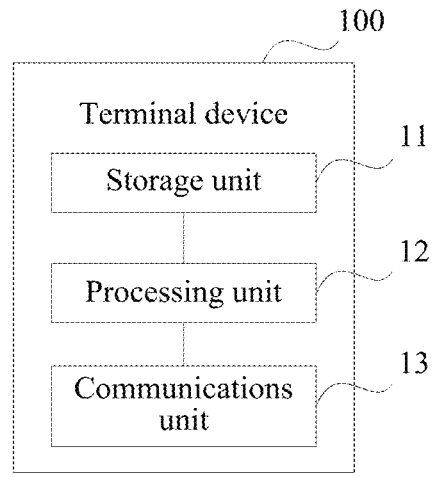
FIG. 13 is a schematic structural diagram of a terminal device according to an embodiment of this application.

When a centralized unit is used, FIG. 13 is a schematic structural diagram of a terminal device according to an embodiment of the present invention. As shown in FIG. 13, the terminal device 100 includes: a processing unit 12 and a communications unit 13. The processing unit 12 is configured to control and manage actions performed by the terminal device (refer to any processing action performed on the terminal device side in FIG. 3 to FIG. 12 and corresponding embodiments in the embodiments of this patent). For example, the processing unit 12 may learn, based on slot offset information included in signaling received from a network side, of a slot of power control information required by the terminal device to perform uplink sending. Details are not described herein again. The communications unit 13 is configured to support communication between the terminal device and a radio access network device, for example, receive a signaling message sent by the radio access network device. The terminal device may further include a storage unit 11, configured to store program code and data required by the terminal device to perform the solutions in the embodiments of the present invention.

The processing unit 12 may be a processor, such as a central processing unit (CPU), a general-purpose processor, a digital signal processor (DSP), an application-specific integrated circuit (ASIC), a field-programmable gate array (FPGA), or another programmable logic device, a transistor logic device, a hardware component, or any combination thereof. The processing unit 12 may implement or execute various example logical blocks, modules, and circuits described with reference to content disclosed in the present invention. Alternatively, the processor may be a combination of processors implementing a computing function, for example, a combination of one or more microprocessors, a combination of a DSP and a microprocessor. The communications unit 13 is a communications interface, for example, a transceiver or a transceiver circuit. The storage unit 11 may be a memory.

Figure 14:
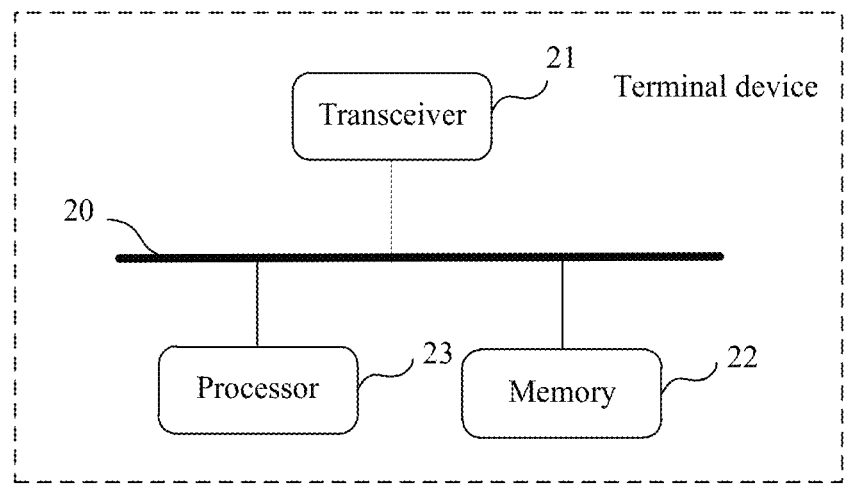
FIG. 14 is a schematic structural diagram of a terminal device according to an embodiment of this application.

When the processing unit 12 is a processor, the communications unit 13 is a transceiver, and the storage unit 11 is a memory, the terminal device in this embodiment of the present invention may be a terminal device shown in FIG. 14.

FIG. 14 is a schematic structural diagram of hardware of a terminal device according to an embodiment of the present invention. As shown in FIG. 14, the terminal device may include a transceiver 21, a processor 23, a memory 22, and a communications bus 20. The communications bus 20 is configured to implement communication and a connection between components. The memory 22 may include a high speed RAM memory, and may further include a non-volatile memory NVM, for example, at least one magnetic disk storage. The memory 22 may store a computer executable program code, where the program code includes an instruction. When the processor 22 executes the instruction, the instruction enables the processor 22 to be configured to perform various processing functions and perform any method step or function performed on a terminal side in the embodiments of this application.

Figure 15:
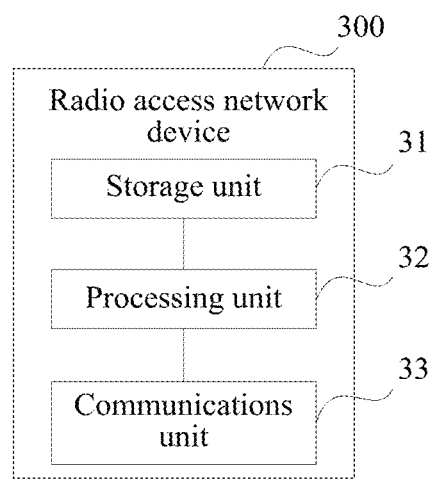
FIG. 15 is a schematic structural diagram of a radio access network device according to an embodiment of this application.

When an integrated unit is used, FIG. 15 is a schematic structural diagram of a radio access network device according to an embodiment of the present invention. The radio access network device 300 includes: a processing unit 32 and a communications unit 33. The communications unit 33 is configured to support communication between the radio access network device and a terminal device. The processing unit 32 is configured to control and manage actions performed by the radio access network device (refer to any processing action/function performed on the radio access network device side in FIG. 3 to FIG. 12 and corresponding embodiments in the embodiments of this patent). For example, the processing unit 32 may generate a signaling message carrying an offset, and the communications unit 33 may send the signaling message to the terminal device. The radio access network device may further include a storage unit 31, configured to store program code and data required by the radio access network device to perform the embodiments of the present invention.

The processing unit 32 may be a processor, such as a central processing unit (CPU), a general-purpose processor, a digital signal processor (DSP), an application-specific integrated circuit (ASIC), a field-programmable gate array (FPGA), or another programmable logic device, a transistor logic device, a hardware component, or any combination thereof. The processing unit 32 may implement or execute various example logical blocks, modules, and circuits described with reference to content disclosed in the present invention. Alternatively, the processor may be a combination of processors implementing a computing function, for example, a combination of one or more microprocessors, a combination of a DSP and a microprocessor. The communications unit 33 may be a communications interface, for example, include a transceiver or a transceiver circuit. The storage unit 31 may be a memory.

Figure 16:
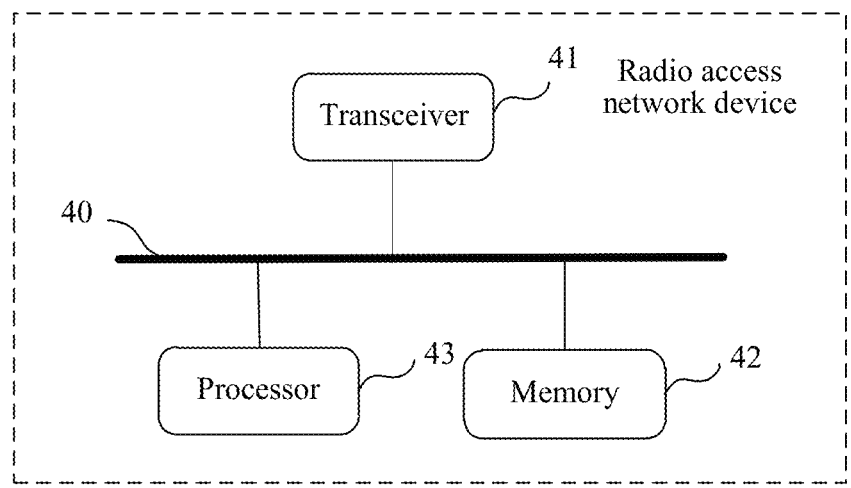
FIG. 16 is a schematic structural diagram of a radio access network device according to an embodiment of this application.

When the processing unit 32 is a processor, the communications unit 33 is a transceiver, and the storage unit 31 is a memory, the radio access network device in this embodiment of the present invention may be a radio access network device shown in FIG. 16. FIG. 16 is a schematic structural diagram of hardware of a radio access network device according to an embodiment of the present invention. As shown in FIG. 16, the radio access network device may include a communications interface 41, a processor 43, a memory 42, and a communications bus 40. The communications bus 40 is configured to implement communication and a connection between components. The memory 42 may include a high speed RAM memory, and may further include a non-volatile memory NVM, for example, at least one magnetic disk storage. The memory 42 may store a computer executable program code, where the program code includes an instruction. When the processor 42 executes the instruction, the instruction enables the processor 42 to be configured to perform various processing functions and perform any method step or function that needs to be performed on a radio access network device side in the embodiments of this patent.

Figure 17:
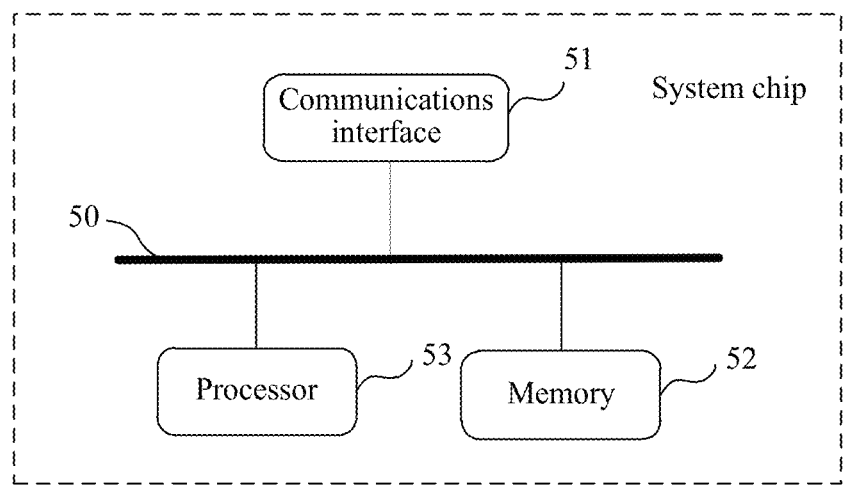
FIG. 17 is a schematic structural diagram of a system chip according to an embodiment of this application.

An embodiment of the present invention further provides a system chip. FIG. 17 is a schematic structural diagram of a system chip according to an embodiment of the present invention. As shown in FIG. 17, the system chip may be applied to a terminal device, and the system chip includes: at least one communications interface 51, at least one processor 53, and at least one memory 52. The communications interface 51, the memory 52, and the processor 53 are connected by using a bus 50. The processor executes an instruction stored in the memory, to enable the terminal device to perform any method step or function performed on a terminal side in the embodiments of this application.

Figure 18:
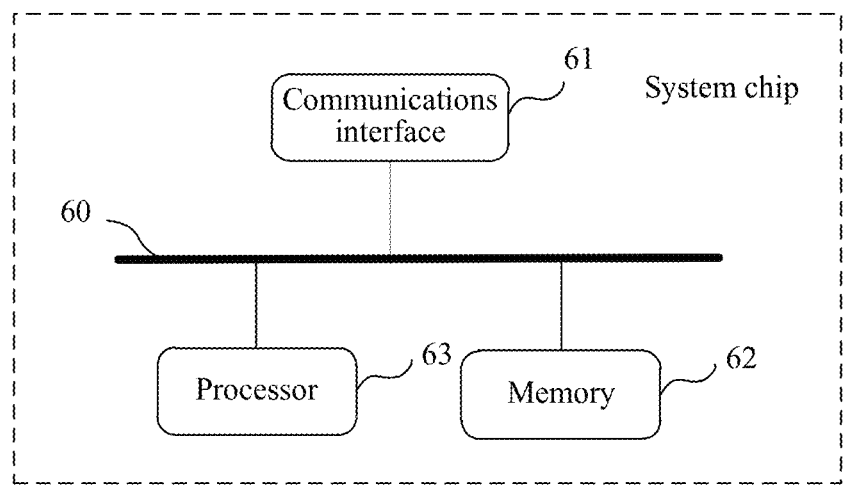
FIG. 18 is a schematic structural diagram of a system chip according to an embodiment of this application.

An embodiment of the present invention further provides a system chip. FIG. 18 is a schematic structural diagram of a system chip according to an embodiment of the present invention. As shown in FIG. 12, the system chip may be applied to a radio access network device, and the system chip includes: at least one communications interface 61, at least one processor 63, and at least one memory 62. The communications interface 61, the memory 62, and the processor 63 are connected by using a bus 60. The processor executes an instruction stored in the memory, to enable the radio access network device to perform any method step or function performed on a radio access network device side in the embodiments of this application.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or a compact disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An uplink transmit power control method by a terminal device, wherein the method comprises:
   receiving a control signaling sent by a radio access network device;
   learning, based on the control signaling, of a slot for a power control information required, by the terminal device, to perform uplink sending; and
   obtaining, in the slot for the power control information required for uplink sending, the power control information required to perform uplink sending,
   determining, using the power control information, a transmit power to perform uplink sending,
   wherein the uplink sending is performed using a plurality of consecutive slots, and
   wherein the determining the transmit power, for ones of the plurality of consecutive slots, is performed in accordance with a calculation mode-based determination performed according to the following supported calculation modes:
       an accumulation calculation mode wherein a transmit power of a subsequent slot after a first slot in the plurality of consecutive slots is same as a first transmit power of the first slot of the plurality of consecutive slots;
       an absolute value calculation mode, where each one of the plurality of consecutive slots is treated individually, where a serial number of the first slot in the plurality of consecutive slots is i and corresponds to an offset k, and where a serial number of a subsequent slot is i+n and sequentially corresponds to a slot offset k+n, and in such case learning, based on the serial number of the slot and the corresponding slot offset by subtracting (k+n) from (i+n), of the slot of the power control information required by the terminal device to perform uplink sending, wherein i, k, and n are all natural numbers; and
   a slot group mode where the plurality of consecutive slots is treated as a slot group, wherein a serial number of the slot group is same as a serial number of the first slot in the plurality of consecutive slots, and learning, based on the serial number of the slot group and the slot offset information, of the slot of the power control information required by the terminal device to perform uplink sending in the slot group.

2. The method according to claim 1,
wherein:
   the control signaling comprises indication information,
   the indication information comprises slot offset information, and
   the slot offset information indicates an offset between:
       the slot of the power control information required by the terminal device to perform uplink sending, and
       a slot scheduled to the terminal device to send an uplink physical channel; and
   wherein the learning of the slot for the power control information comprises:
   learning, based on the slot offset information comprised in the control signaling, of the slot for the power control information.

3. The method according to claim 1, wherein the method comprises:
   establishing the slot scheduled to the terminal device to send the uplink physical channel is one slot,
   sending, based on the establishing, the uplink physical channel in the slot by using the power control information.

4. The method according to claim 1, wherein the method comprises:
   establishing the slot scheduled to the terminal device, at a time to perform the uplink sending, is the plurality of consecutive uplink slots.

5. The method according to claim 1, wherein:
   the control signaling is layer 1 signaling or layer 2 signaling, the indication information is uplink scheduling information, the uplink scheduling information comprises the slot offset information, and the uplink sending is performed on a physical uplink shared channel.

6. The method according to claim 1, wherein:
   the slot offset indication information comprises a plurality of slot offsets, and all of the plurality of slot offsets indicate offsets between a plurality of slots of a plurality of pieces of power control information required by the terminal device to perform uplink sending and the slot scheduled to the terminal device to send the uplink physical channel; and
   wherein the method further comprises:
   learning, based on the plurality of slot offsets, of the plurality of slots that separately correspond to the plurality of slot offsets and that are of the plurality of pieces of power control information required by the terminal device to perform uplink sending.

7. The method according to claim 1, wherein:
the control signaling is layer 1 signaling or layer 2 signaling, the indication information is downlink scheduling information, the downlink scheduling information comprises the plurality of slot offsets, and the uplink physical channel is a physical uplink control channel.

8. A terminal device comprising:
a processor; and
a non-transitory computer-readable medium including computer-executable instructions that, when executed by the processor, cause the terminal device to carry out an uplink transmit power control method comprising:
receiving a control signaling sent by a radio access network device;
learning, based on the control signaling, of a slot for a power control information required, by the terminal device, to perform uplink sending; and
obtaining, in the slot for the power control information required for uplink sending, the power control information required to perform uplink sending,
determining, using the power control information, a transmit power to perform uplink sending,
wherein the uplink sending is performed using a plurality of consecutive slots, and
wherein the determining the transmit power, for ones of the plurality of consecutive slots, is performed in accordance with a calculation mode-based determination performed according to the following supported calculation modes:
an accumulation calculation mode wherein a transmit power of a subsequent slot after a first slot in the plurality of consecutive slots is same as a first transmit power of the first slot of the plurality of consecutive slots;
an absolute value calculation mode, where each one of the plurality of consecutive slots is treated individually, where a serial number of the first slot in the plurality of consecutive slots is i and corresponds to an offset k, and where a serial number of a subsequent slot is i+n and sequentially corresponds to a slot offset k+n, and in such case learning, based on the serial number of the slot and the corresponding slot offset by subtracting (k+n) from (i+n), of the slot of the power control information required by the terminal device to perform uplink sending, wherein i, k, and n are all natural numbers; and
a slot group mode where the plurality of consecutive slots is treated as a slot group, wherein a serial number of the slot group is same as a serial number of the first slot in the plurality of consecutive slots, and learning, based on the serial number of the slot group and the slot offset information, of the slot of the power control information required by the terminal device to perform uplink sending in the slot group.

9. The terminal device of claim 8,
wherein:
the control signaling comprises indication information, the indication information comprises slot offset information, and
the slot offset information indicates an offset between:
the slot of the power control information required by the terminal device to perform uplink sending, and
a slot scheduled to the terminal device to send an uplink physical channel; and
wherein the learning of the slot for the power control information comprises:
learning, based on the slot offset information comprised in the control signaling, of the slot for the power control information.

10. The terminal device according to claim 8, wherein the method comprises:
establishing the slot scheduled to the terminal device to send the uplink physical channel is one slot,
sending, based on the establishing, the uplink physical channel in the slot by using the power control information.

11. The terminal device according to claim 8, wherein the method comprises:
establishing the slot scheduled to the terminal device, at a time to perform the uplink sending, is the plurality of consecutive uplink slots.

12. The terminal device according to claim 8, wherein:
the control signaling is layer 1 signaling or layer 2 signaling, the indication information is uplink scheduling information, the uplink scheduling information comprises the slot offset information, and the uplink sending is performed on a physical uplink shared channel.

13. The terminal device according to claim 8, wherein:
the slot offset indication information comprises a plurality of slot offsets, and all of the plurality of slot offsets indicate offsets between a plurality of slots of a plurality of pieces of power control information required by the terminal device to perform uplink sending and the slot scheduled to the terminal device to send the uplink physical channel; and
wherein the method further comprises:
learning, based on the plurality of slot offsets, of the plurality of slots that separately correspond to the plurality of slot offsets and that are of the plurality of pieces of power control information required by the terminal device to perform uplink sending.

14. The terminal device according to claim 8, wherein:
the control signaling is layer 1 signaling or layer 2 signaling, the indication information is downlink scheduling information, the downlink scheduling information comprises the plurality of slot offsets, and the uplink physical channel is a physical uplink control channel.

* * * * *